Paul M. Arnett
Claude M. Faust
INVENTORS

BY Oliver D. Olson
Agent

Paul M. Arnett
Claude M. Faust
INVENTORS
BY
Oliver D. Olson
Agent

United States Patent Office 3,531,719
Patented Sept. 29, 1970

3,531,719

APPARATUS FOR MONITORING THE ACTIVATIONS OF TELEPHONE EXCHANGE EQUIPMENT

Paul M. Arnett, P.O. Box 232, Molalla, Oreg. 97038, and Claude M. Faust, 6017 N. Hudson St., Portland, Oreg. 97203

Continuation-in-part of application Ser. No. 418,826, Dec. 16, 1964. This application June 23, 1966, Ser. No. 564,478
Int. Cl. H04b 3/46
U.S. Cl. 324—73 8 Claims

ABSTRACT OF THE DISCLOSURE

An electric motor rotates a switch actuator relative to a plurality of spaced switches connected to a plurality of electric circuits the activations of which are to be counted. An electrically actuated counter is connected through the switches to the circuits to be counted and is activated by the latter to count their activations.

This invention relates to apparatus for monitoring the performance of telephone exchange equipment.

This application is a continuation-in-part of our earlier application, Ser. No. 418,826, filed Dec. 16, 1964 and now abandoned.

It is conventional practice among independent telephone companies to make toll separation studies in order to determine the proportionate share of the toll dollars accuring to each of them as a result of toll calls involving the telephone lines of two or more such companies. Studies of this and other types are made by connecting counters to the various units of telephone exchange equipment, such as line finders, first and second selectors, revert calls, toll calls, connectors, and others. These counters function by the detection of electric impulses on each circuit of the equipment, to count the number of times a circuit is activated in a given length of time.

Further, it is conventional practice among telephone companies to utilize such counters for engineering studies. Thus, it is by the valuation of such count studies that peak and average equipment loads can be determined, giving indication as to whether additional equipment should be added to accommodate future needs.

Monitoring equipment of the type described heretofore have been characterized by several disadvantages, principal among which are the following: They are complex and heavy mechanical assemblies utilizing mechanical relay type switches which are noisy, develop considerable heat and are erratic in operation. They are of costly construction and require substantial maintenance and repair.

Accordingly, it is the principal object of the present invention to provide telephone exchange equipment monitoring apparatus which eliminates use of the mechanical relay type switches of the prior art and therefore operates silently and without the development of heat; is precise in its operation; has long service life; is light in weight and therefore easily portable; and is of simplified construction for economical manufacture.

Another important object of this invention is the provision of telephone exchange equipment monitoring apparatus which accommodates several times the number of circuit counters per equivalent weight of apparatus of the prior art.

The foregoing and other objects and advantages of this invention will appear from the following detailed description, taken in connection with the accompanying drawing in which.

Figures 1, 2, 3, 4:
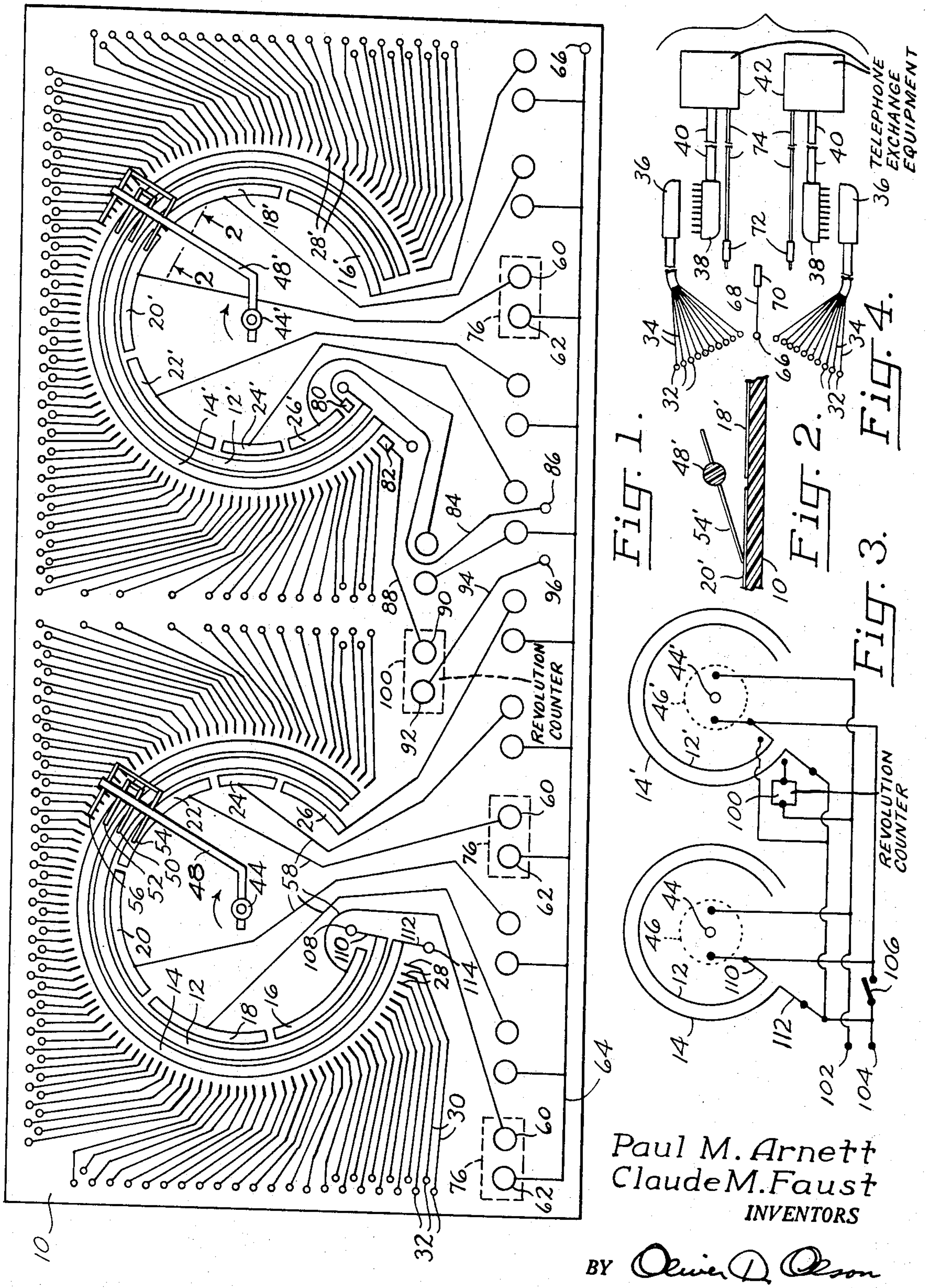
FIG. 1 is a schematic electrical diagram of a circuit arrangement for apparatus embodying the features of the present invention.
FIG. 2 is a fragmentary sectional view taken on the line 2—2 in FIG. 1.
FIG. 3 is a schematic diagram of an electric circuit for the drive and revolution counter system of the circuit of FIG. 1.
FIG. 4 is an exploded, foreshortened schematic view illustrating the electrical connections between the apparatus of FIG. 1 and telephone exchange equipment to be monitored.

Referring particularly to FIG. 1, the circuit assembly shown therein is mounted on a panel 10 of electrically nonconductive material, such as fiberglass-reinforced polyester resin, or other suitable material, by printed circuit or other suitble well known techniques.

In the embodiment illustrated there are two independent counter systems in the unitary assembly of the apparatus. It will be understood, of course, that the apparatus may include but a single circuit assembly, or it may include three or more independent circuit assemblies, as desired, to accommodate the number of circuits to be monitored.

The two circuit assemblies illustrated in FIG. 1 are substantially identical. Considering first the circuit assembly on the left hand half of the panel, there is provided a pair of concentric, radially spaced annular split rings 12 and 14 of electrically conductive material. These rings are continuous between their spaced ends. Radially inward of the inner one of the continuous split rings there is disposed a plurality of circumferentially spaced arcuate segments of electrically conductive material, there being six such segments 16, 18, 20, 22, 24 and 26 illustrated.

Disposed concentrically about, and radially outward of, the outer one of the continuous split rings are in multiplicity of circumferentially spaced electrically conductive contacts 28. Each is connected to an electrical conductor 30 which extends outward to a hole 32 in the base panel 10. The outer end of each conductor is connected electrically to a wire 34 (FIG. 4) which extends through the hole from the underside of the panel. Each of these wires is connected to a multiple plug-in terminal 36.

There are a plurality of contacts 28 associated with each of the conductive segments. Thus, in the left hand assembly of the embodiment illustrated, there are twenty contacts associated with each of the segments 16, 18, 20 and 22, and ten contacts associated with each of the segments 24 and 26. This provides for the monitoring of one hundred individual circuits of six units of telephone exchange equipment.

Accordingly, each of the contacts 28 in a group is connected through its associated conductor 30 to a separate one of the multiple terminals of the female connector 36 (FIG. 4). A matching multiple male terminal connector 38 has its individual male contacts connected through separate conductors in the cable 40 to individual circuits in telephone exchange equipment 42 desired to be monitored. Therefore, by interconnecting the female and male terminal connectors, each telephone exchange equipment circuit desired to be monitored is connected to one of the contacts 28 of the group.

At the center of the concentric ring assembly the base panel 10 is provided with an opening through which freely extends the rotary output shaft 44 of a synchronous electric motor and gear reduction unit 46 (FIG. 3), the latter being mounted on the underside of the panel. Secured to the outwardly projecting shaft is an electrically nonconductive arm 48 which extends across and is spaced from the conductive rings. The arm supports the radially spaced pair of resilient electrically conductive brushes 50 and 52 which are interconnected electrically at their outer ends and which at their inner ends make sliding contact with the continuous split rings 12 and 14, respectively. By this means it will be apparent that the rings are interconnected electrically through the brushes when the latter are in contact therewith.

Similarly, the arm 48 supports the pair of radially spaced resilient electrically conductive brushes 54 and 56 which also are interconnected electrically at their outer ends. The inner ends of these brushes are arranged for sliding engagement with the segments 16–26 and contacts 28, respectively. Thus, each contact is connected electrically to its associated segments momentarily during rotation of the arm and brush assembly.

Each segment is connected electrically through a conductor 58 to one terminal 60 of separate pairs of terminals, the other terminal 62 of each pair being connected electrically to a common conductor 64 which extends to the opening 66 through the base panel 10. A wire 68 (FIG. 4) extends upwardly through this opening for electrical connection to the common conductor, and the opposite end of the wire is connected to the female plug 70. A matching male plug 72 is connected through the cable 74 to the common return circuit of each telephone exchange equipment 42, and is adapted to be connected to the female plug in order to complete the electric circuit of the exchange equipment to be monitored.

Each pair of terminals 60, 62 is adapted for releasable connection of a recording circuit counter 76. The counter may be of any conventional type desired, such as a conventional digit counter, a printer type counter, or others. Typical of a suitable digit counter is the electro-magnetic counter manufactured by the Switzerland firm SODECO and identified as Stromberg Carlson Model No. 202628–000.

By means of the foregoing arrangement it can be seen that as the pair of brushes 54, 56 scan across a segment whose associated contacts 28 are connected to a selected unit of telephone exchange equipment, any particular electrical circuit in the equipment which is active at the time that the brush 56 engages the particular contact connected to said active circuit, will supply an electric current to the counter 76 and cause it to record, as a count, the incidence of said circuit being active at that particular time. Similarly, any other circuit of the telephone exchange equipment connected to any other contact of the associated segment, also will activate the counter if such circuit is active at the time the brush 56 engages the associated contact.

The circuit assembly shown on the right hand half of the panel in FIG. 1 includes all of the components of the previously described assembly, and they are identified by the same reference numerals but distinguished by the prime superscript.

The right hand assembly also includes a pair of contacts 80, 82 aligned with the ring of segments and ring of contacts 28, respectively. This pair of contacts is positioned adjacent the leading end of the concentric rings, i.e. at the end facing the direction of rotation of the brush assembly, as indicated by the arrows in FIG. 1, so as to be engaged by the pair of brushes 54, 56 at the start of each cycle of revolution. The contact 80 of the pair is connected through the conductor 84 to a wire which extends through the opening 86 in the base panel 10. The other contact 82 of the pair is connected through the conductor 88 to one 90 of a pair of terminals, the other 92 of which is connected through the conductor 94 to a wire which extends through the opening 96 in the base panel 10.

The pair of terminals 90, 92 serve to releasably connect an electric revolution counter 100. A source of electric supply is provided for the revolution counter and is connected across the wires leading from the conductors 84 and 94. Conveniently, such a supply may be derived in the telephone exchange equipment being monitored, by appropriate connection through electrical conductors (not shown).

Means is provided by which the revolution counter 100 also serves to count the number of revolutions made by the arm 48 of the left hand assembly, even though the counter is connected electrically only to the right hand assembly. Referring to FIG. 3 of the drawing, this means is provided by utilizing a synchronous electric motor 46 for each assembly and connecting these motors to the same source of electric supply. Thus, one terminal of each electric motor is connected to the same terminal 102 of the electric supply, and the other terminal of each motor is connected to the other terminal 104 of said electric supply, through the master on-off switch 106.

Said other terminal of each electric motor also is connected through a wire which extends through an opening 108 in the base panel 10 for electrical connection with the conductor 110 connected electrically to the inner one 12 of the pair of concentric continuous split rings. The outer one 14 of said concentric pair of split rings is connected through the conductor 112 to a wire extending through the opening 114 in the base panel and connected to the terminal 104 of the electric supply.

It will be seen from FIG. 3 that the master on-off switch 106 is arranged in shunt with the pair of concentric continuous split rings 12, 14. Thus, when the pair of brushes 50, 52 disengage from the trailing ends of the split rings, the electric circuits of the synchronous motors are broken, thereby stopping the rotation of the arm assemblies after each rotation. The next cycle of rotation is initiated by closing the master on-off switch momentarily, to bring the pair of brushes into contact with the leading ends of the concentric rings, after which the master on-off switch may be allowed to open.

In the event it is desired to maintain continuous rotation of the arm assemblies, the master on-off switch may be closed permanently, as will be apparent.

The base panel preferably forms the top cover of a hollow container which conceals within it the electric motors and wire located on the underside of the panel. The multiple terminal connectors 36 and plug 70 thus conveniently are mounted in openings in the container, for convenient connection of the matching male terminal connectors 38 and plug 72.

The conductive segments 16–26 may be dimensioned for association with any number of contacts forming a group. For example, if it is desired to monitor a unit of telephone exchange equipment which has very few circuits, a segment may be associated with fewer than ten contacts forming a group. On the other hand, if the unit of telephone exchange equipment involves a large number of circuits to be monitored, a segment may be provided for association with more than 20 contacts of a group.

Although the circuit arrangement illustrated in FIG. 1 may be provided by conventional printed circuit technique, it is preferred that a more durable printed circuit construction be provided in order to assure faithful operation of the apparatus over a substantially greater length of time than is afforded by conventional printed circuitry. Exemplary of such preferred printing techniques is the following: A thin layer of copper is bonded to the surface of the nonconductive base panel 10. A template then is placed over the copper layer to mask all areas of the latter except the two central circular areas which include the circumferentially arranged contacts 28. The masked assembly then is electroplated with nickle and rhodium to plate the central portions therewith. After removing the template, a silk screen is placed over the entire surface, which screen exposes only those areas of the copper and central platings which define the electrical circuit lines. A material which is characterized by being resistive to etching solution then is applied over the silk screen to form a resistive coating only in the areas defining the circuit lines. The silk screen then is removed and the assembly subjected to the action of etching solution which functions to remove all of the copper and plated areas not defining the circuit lines. By subsequent cleaning to remove the etch resistant material, the finished panel is as shown in FIG. 1. The spaced contacts 28 and the three concentric rings are provided as wear resistant rhodium surfaces, and the associated electrical conductors are provided in copper.

The brush elements also are provided in a wear resistant material such as the palladium alloy known as Palanine No. 7, or other suitable electrically conductive material. In this manner the apparatus is capable of cycling almost indefinitely without destruction of the contacting surfaces.

Figure 5:
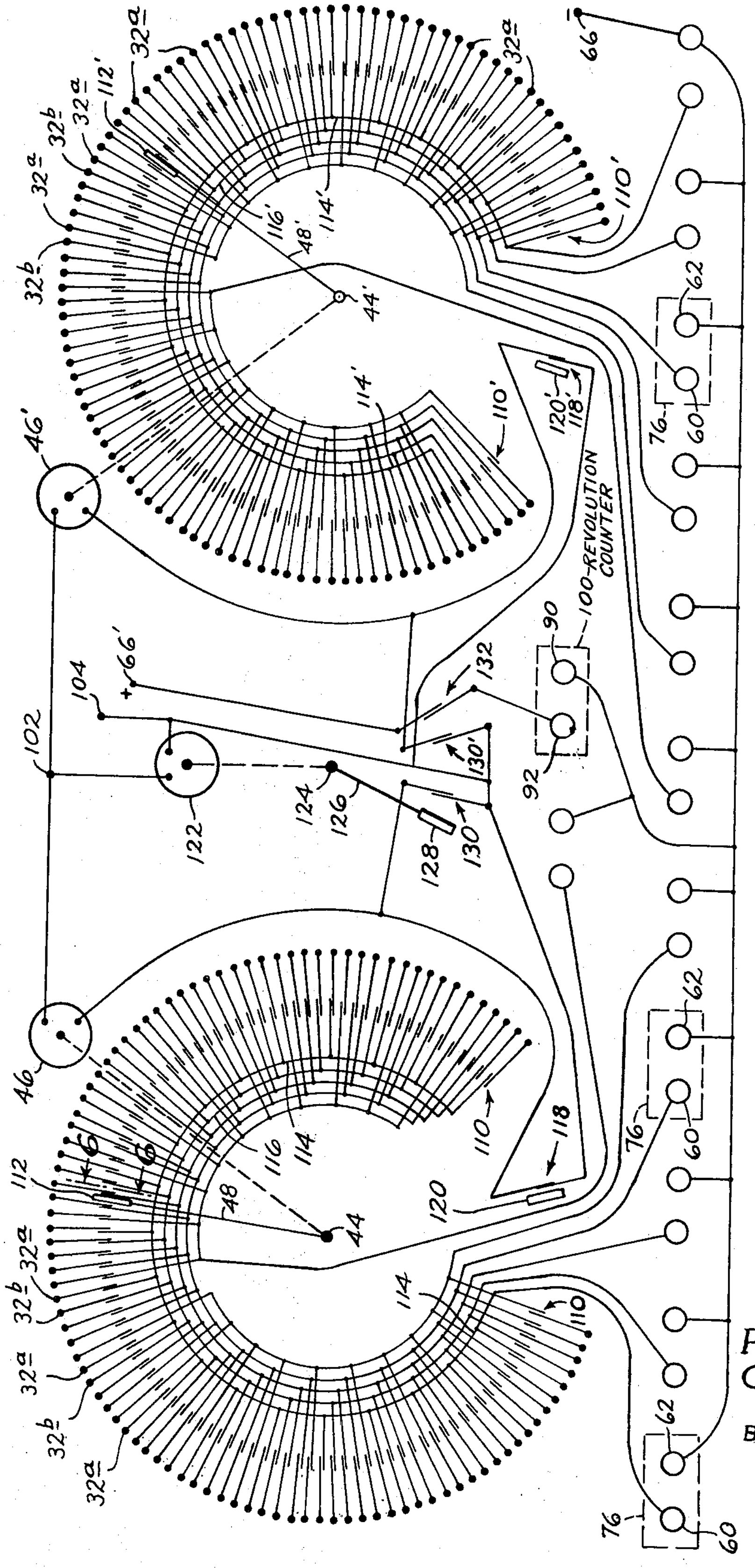
FIG. 5 is a schematic electrical diagram of another circuit arrangement for apparatus embodying the features of the present invention.
Figure 6:
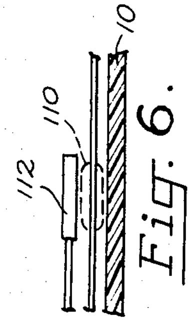
FIG. 6 is a fragmentary sectional view taken on the line 6—6 in FIG. 5.

The apparatus illustrated schematically in FIGS. 5 and 6 differs primarily from the apparatus of FIG. 1 in that the physically engaging switch components 16–28 and 50–56 are replaced by switch means which do not involve physical engagement of relatively movable components, thereby eliminating all possibility of wear.

Thus, in FIG. 5 the switch means between any selected terminal 60 and the associated terminals 32 comprises a magnetically actuated reed switch 110. These switches are normally open and are closed by the influence of a magnet 112 carried on the arm 48 which is secured for rotation with the shaft 44 of the drive motor 46.

Because of the close spacings between adjacent reed switches the magnetic field of the magnet may influence more than one of them at a time, in any given position of the magnet. Accordingly, the reed switches associated with a given terminal 60 are spaced apart circumferentially sufficiently to prevent the magnet from influencing more than one of them at a time. In the embodiment illustrated, the reed switches of a given group are connected together at one end to the common terminal 60 and at the opposite end to every fifth one of the terminals 32. Thus, the reed switches connected to the terminal 32*a* are connected together at their opposite ends to the common conductor 114, those connected to the terminals 32*b* are connected together at their opposite ends through the conductor 116, and so on.

The drive motor 46 is stopped after each cycle of operation. In the embodiment illustrated, this is achieved by inserting in the electric circuit of the motor a reed switch 118 positioned for influence by the magnet. This reed switch is maintained normally closed by an adjacent fixed magnet 120. Thus, when the rotating magnet 112 moves into proximity to the normally closed reed switch it cancels the magnetic field of the magnet 120, allowing the reed switch to open. This breaks the electric circuit of the motor.

Means is provided for starting each of the drive motors 46 and 46′ after each cycle of operation. In the embodiment illustrated, this means includes a timer motor 122 which is connected across the electric supply terminals 102 and 104 to provide continuous operation. The rotary output shaft 124 of the motor carries an arm 126 which supports a magnet 128 at its outer end. Connected in the electric circuit of each drive motor is a normally open reed switch 130. These switches are disposed in the circular path of rotation of the magnet 128 so as to be influenced thereby to momentarily complete the electric circuits of the drive motors. The timer motor preferably rotates at a slower speed than the drive motors, for example 1 r.p.m. as compared with 4 r.p.m. for the drive motors. Accordingly, the drive motors need not be synchronized in their rotation, since they will end a cycle of operation before the next cycle is initiated by the timer motor.

It will be apparent that immediately following activation of each drive motor, by closure of the starting switch 140, the magnet 112 on the arm of the drive motor moves away from the motor stop switch 118, causing the latter to close by influence of the adjacent magnet 120. The electric circuit of the drive motor thus is completed through this switch, permitting the associated start switch to open as the timer motor magnet moves away from it.

The circuit of the revolution counter 100 also is completed through a normally open reed switch 132 arranged for activation by the timer motor magnet 128. Thus, each revolution of the timer motor magnet influences the closing of the switch 132 momentarily to provide an electric pulse to activate the counter.

As illustrated in FIG. 6, the rotary magnets 112 are disposed above and spaced from reed switches 110. The absence of physical sliding engagement between such switch components thus eliminates wear and assures the longest possible service life.

Figure 8:
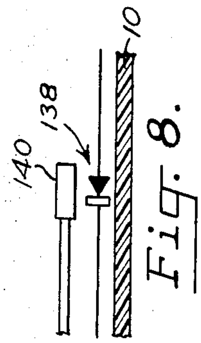
FIG. 8 is a fragmentary diagrammatic view of a semiconductor diode operable by a radioactive material in place of the reed delays and magnets, respectively, of FIG. 5.
Figure 7:
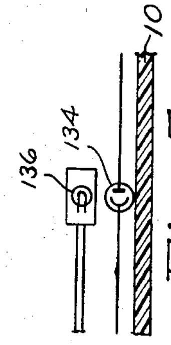
FIG. 7 is a fragmentary diagrammatic view of a photosensitive device operable by a light source in place of the reed relays and magnets, respectively, of FIG. 5.

Various other types of switches may be substituted for the reed switches and magnets described hereinbefore. For example, in FIG. 7 the reed switch of FIGS. 5 and 6 is replaced by a photosensitive device 134, such as a photocell, photodiode, phototransistor, photoresistor, or other similar and well known devices, and the magnet is replaced by a source 136 of light, heat or other radiant energy. In FIG. 8 the reed switches of FIGS. 5 and 6 are replaced with silicon, germanium, or other suitable semiconductor diodes 138 and the magnets are replaced by material 140 having radioactive properties.

Thus, the apparatus of the present invention is characterized by extremely long service life, it operates silently and with high precision, is capable of monitoring a large number of circuits, and yet is of relatively simplified construction for economical manufacture.

Having now described our invention and the manner in which it may be used, what we claim as new and desire to secure by Letters Patent is:

1. Apparatus for counting the intermittent activations of a plurality of electric circuits, comprising:

(a) a base of electrically non-conductive material, (b) a plurality of spaced electrical conductor means on the base arranged in groups each associated with a circuit to be counted, (c) a plurality of electrically conductive collector means on the base each associated with the conductor means of a different group and spaced electrically therefrom, (d) a plurality of switch means spaced apart on the base and each releasably connecting a different conductor means to its associated collector means, (e) switch actuator means operable upon movement into closely spaced relation to each switch means to actuate the latter, (f) switch operator means supporting the switch actuator means for movement into closely spaced relation to each switch means for actuating the latter sequentially comprising an electric drive motor having an electric circuit, and including drive motor stop switch means in the electric circuit of the drive motor and operable by said drive motor to break the electric circuit of the latter upon completion of one cycle of operation of the motor, the stop switch means comprising a pair of magnetic switch contacts in the electric circuit of the drive motor, a fixed magnet adjacent said contacts normally closing the latter, and a movable magnet mounted for movement by the drive motor to a position adjacent the switch contacts to effect opening of the latter upon completion of one cycle of operation of the motor, and (g) electrically actuated counter means connected to each collector means for actuation by each activated circuit when the associated conductor means and collector means are interconnected by the switch means.

2. The apparatus of claim 1 wherein the switch means comprises a pair of magnetic switch contacts, the switch actuator means comprises a permanent magnet, and the switch operator means comprises an electric drive motor for moving said magnet.

3. The apparatus of claim 1 wherein the switch means comprises photosensitive switch means, the switch actuator means comprises a source of radiant energy, and the switch operator means comprises an electric drive motor for moving said source of radiant energy.

4. The apparatus of claim 1 wherein the switch means comprises a semi-conductor diode switch device, the switch actuator means comprises a source of radioactive energy, and the switch operator means comprises an electric drive motor for moving said source of radioactive energy.

5. Apparatus for counting the intermittent activations of a plurality of electric circuits, comprising:

(a) a base of electrically non-conductive material, (b) a plurality of spaced electrical conductor means on the base arranged in groups each associated with a circuit to be counted, (c) a plurality of electrically conductive collector means on the base each associated with the conductor means of a different group and spaced electrically therefrom, (d) switch means on the base arranged to releasably connect each conductor means to its associated collector means, (e) switch operator means engaging the switch means for actuating the latter sequentially and comprising an electric drive motor having an electric circuit, (f) drive motor stop switch means comprising a pair of magnetic switch contacts in the electric circuit of the drive motor, a fixed magnet adjacent said contacts normally closing the latter, and a movable magnet mounted for movement by the drive motor to a position adjacent the switch contacts to effect opening of the latter upon completion of one cycle of operation of the motor, and (g) electrically actuated counter means connected to each collector means for actuation by each activated circuit when the associated conductor means and collector means are interconnected by the switch means.

6. Apparatus for counting the intermittent activations of a plurality of electric circuits, comprising:

(a) a base of electrically non-conductive material, (b) a plurality of circumferentially spaced arcuate segments of electrically conductive material on the base forming a plurality of electrical conductor contacts, (c) a plurality of circumferentially spaced arcuate segments of electrically conductive material on the base spaced radially from the contacts and forming a plurality of electrically conductive collector means each associated with the contacts of a different group, (d) switch means on the base comprising a pair of radially spaced, interconnected brushes of electrically conductive material mounted for rotation relative to the contacts and collector segments and arranged for sliding engagement therewith for interconnecting electrically each contact and its associated collector segment, (e) switch operator means comprising an electric drive motor engaging the brushes for rotating the latter, (f) electrically actuated counter means connected to each collector segment for actuation by each activated circuit when the associated conductor contact and collector segment are interconnected by the brushes, (g) a pair of radially spaced revolution counter contacts of electrically conductive material on the base aligned with and spaced circumferentially from the first named plurality of contacts and collector segments, respectively, for sliding engagement by the pair of brushes, (h) an electrically actuated revolution counter, and (i) conductor means connecting said pair of revolution counter contacts to the revolution counter, (j) there being on the base a plurality of spaced assemblies of said collector segments, groups of contacts, pair of brushes and drive means, wherein only one of the assemblies includes a pair of revolution countercontacts and counter, and wherein each drive means comprises a synchronous electric motor, and conductor means is provided for connecting each motor to the same source of electric supply.

7. Apparatus for counting the intermittent activations of a plurality of electric circuits, comprising:

(a) a base of electrically non-conductive material, (b) a plurality of circumferentially spaced arcuate segments of electrically conductive material on the base forming a plurality of electrical conductor contacts, (c) a plurality of circumferentially spaced arcuate segments of electrically conductive material on the base spaced radially from the contacts and forming a plurality of electrically conductive collector means each associated with the contacts of a different group, (d) switch means on the base comprising a pair of radially spaced, interconnected brushes of electrically conductive material mounted for rotation relative to the contacts and collector segments and arranged for sliding engagement therewith for interconnecting electrically each contact and its associated collector segment, (e) switch operator means comprising an electric drive motor engaging the brushes for rotating the latter, and (f) electrically actuated counter means connected to each collector segment for actuation by each activated circuit when the associated conductor contact and collector segment are interconnected by the brushes, (g) a pair of radially spaced revolution counter contacts of electrically conductive material on the base aligned with and spaced circumferentialy from the first named plurality of contacts and collector segments, respectively, for sliding engagement by the pair of brushes, and (h) an electric motor having its rotary shaft connected to an arm supporting the pair of brushes, (i) the apparatus including a pair of radially spaced split rings of electrically conductive material on the base, a second pair of radially spaced, electrically interconnected brushes supported by the arm and arranged for sliding engagement one with each of the split rings, and conductor means connecting the electric motor through said split rings for connection to a source of electric supply.

8. The apparatus of claim 7 including master switch means connected to the conductor means in shunt with the split rings for actuating the electric motor when the pair of second brushes are disengaged from the split rings between the spaced ends of the latter.

References Cited

UNITED STATES PATENTS

| | | | |
|---|---|---|---|
| 2,902,564 | 9/1959 | Fleck | 200—19 XR |
| 2,922,994 | 1/1960 | Kennedy | 200—19 XR |
| 2,929,896 | 3/1960 | Ronning | 200—19 XR |
| 3,087,030 | 4/1963 | Shebanow. | |

RUDOLPH V. ROLINEC, Primary Examiner

E. L. STOLARUN, Assistant Examiner

U.S. Cl. X.R.

179—8; 200—19; 324—28